United States Patent [19]
Morrow

[11] Patent Number: 5,142,480
[45] Date of Patent: Aug. 25, 1992

[54] METHOD AND APPARATUS FOR PROVIDING AN INDICATION AS TO WHETHER AN AIRCRAFT CAN SAFELY GLIDE TO A SELECTED DESTINATION

[75] Inventor: James Morrow, Salem, Oreg.

[73] Assignee: IIMorrow, Inc., Salem, Oreg.

[21] Appl. No.: 485,616

[22] Filed: Feb. 27, 1990

[51] Int. Cl.⁵ ............................................. G06F 15/50
[52] U.S. Cl. .................................. 364/452; 364/433; 73/178 T
[58] Field of Search ............... 364/428, 430, 433, 446, 364/452, 444; 73/178 T; 244/185, 186

[56] References Cited

U.S. PATENT DOCUMENTS

| | | | |
|---|---|---|---|
| Re. 31,962 | 7/1985 | Brodeur | 364/452 |
| 3,258,582 | 6/1966 | Winblade et al. | 364/428 |
| 3,280,310 | 10/1966 | Montooth | 364/428 |
| 4,387,360 | 6/1983 | Jourdan et al. | 364/430 |
| 4,538,229 | 8/1985 | Baltzer et al. | 364/428 |
| 4,774,670 | 9/1988 | Palmieri | 364/446 |
| 4,825,374 | 4/1989 | King et al. | 364/428 |

OTHER PUBLICATIONS

Pilots Operating Handbook, Apollo II Model 612B (Sep. 1987).

Primary Examiner—Parshotam S. Lall
Assistant Examiner—Michael Zanelli
Attorney, Agent, or Firm—William A. Birdwell & Associates

[57] ABSTRACT

A method and apparatus for providing an indication as to whether an aircraft can safely glide to a selected location. An electronic processor is provided with a manual data input, a Loran navigation system input, or electronic altimeter input, a memory, a display, and a processor program. Data representing the identity, location, and other features of a set of possible airport landing sites are stored in the memory. Data representing the aircraft flight performance parameters is entered manually. Based on the airport data, aircraft performance data, Loran data, and altimeter data, the program causes the processor to determine and display a predetermined number of nearest airports, the altitude required to glide to those airports from the aircraft's current location, or the difference between the distance to the airports and the distance the aircraft can glide from its current altitude, and whether the aircraft can safely glide to a selected airport.

29 Claims, 3 Drawing Sheets

METHOD AND APPARATUS FOR PROVIDING AN INDICATION AS TO WHETHER AN AIRCRAFT CAN SAFELY GLIDE TO A SELECTED DESTINATION

BACKGROUND OF THE INVENTION

This invention relates to methods and apparatuses for providing navigation information to the pilot of an aircraft, in particular, to providing the pilot with information regarding whether the aircraft can safely glide to a landing site in the absence of power.

All too often, an aircraft loses power in flight for one reason or another. When this happens, it is important for the pilot to know the landing sites to which the pilot can safely glide. However, in such anxiety-provoking circumstances it is often difficult for the pilot to make the necessary calculations, at least to do so in a timely fashion.

Various kinds of electronic navigation aids have previously been disclosed. It is well understood that electronic altimeters are available for providing a signal representative of the current altitude of an aircraft. Loran systems also provide electronic data representative of the current lateral position of the aircraft.

Hendrickson U.S. Pat. No. 4,220,994 discloses a system that stores information regarding the location of airports and VOR stations, transmitting frequencies, and aircraft running characteristics, and executes programs for preparing flight plans and resolving common navigational problems such as dead reckoning, wind effect, bearing correction, fuel consumption, and for generating flight profile data for fuel optimization. Thurman U.S. Pat. No. 4,706,198 discloses an air traffic control system that communicates with an aircraft and computes flight plans based upon the position of the aircraft. Fischer U.S. Pat. No. 4,674,051 discloses a system that uses aircraft position data to look up the closest navigation point and information about that point in an electronic look up table. James et al U.S. Pat. No. 4,283,705 discloses a combined, heading, altitude, and horizontal situation display device. Forsythe et al. U.S. Pat. No. 4,212,064 U.S. Patent discloses a system for displaying optimum altitude, air speed, and other settings for achieving flight economy. However, none of these navigational aids tells the pilot whether the aircraft can safely glide to a selected landing sight, what the minimum required altitude is for a safe glide, or what the margin of safety is.

It would therefore be desirable to have a method and apparatus that would automatically provide the desired information to the pilot upon the occurrence of a loss of power.

SUMMARY OF THE INVENTION

The present invention employs altitude information from an altimeter, location information from a Loran system, airport location and elevation information from a look up table, and aircraft flight dynamic information from a look up table to compute whether the aircraft can safely glide to a selected airport. (As used herein, the term "position" includes both lateral position and altitude, or elevation, e.g., the position in space of an aircraft or airport. The term location is used to refer to lateral position only.) Using a programmed microprocessor and data inputs from the altimeter, Loran, and processor memory, it computes the distance that the aircraft can glide from its current location and altitude, compares that to the location and elevation of the selected airport, and displays an indication of whether or not the aircraft can glide that far. It takes into account whether a turn is required to reach the airport, and the losses that would occur as a result of the turn. It displays the safety margin, or difference between the distance that the aircraft can glide from its current location and altitude, and the distance to the selected airport. Alternatively, it displays the minimum altitude required to reach the selected airport from the current location of the aircraft.

Accordingly, it is a principal objective of the present invention to provide a novel and improved method and apparatus for providing information as to whether an aircraft can safely glide to a selected destination.

It is another objective of the present invention to provide a method and system that computes and displays whether or not the aircraft can safely glide to a selected destination.

It is a further objective of the present invention to provide a method and system that computes and displays the difference between the distance that the aircraft can safely glide from its present location and altitude, and the distance to a selected destination.

It is yet another objective of the present invention to provide a method and system that computes and displays the minimum altitude required for an aircraft to reach a selected destination from its current location.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
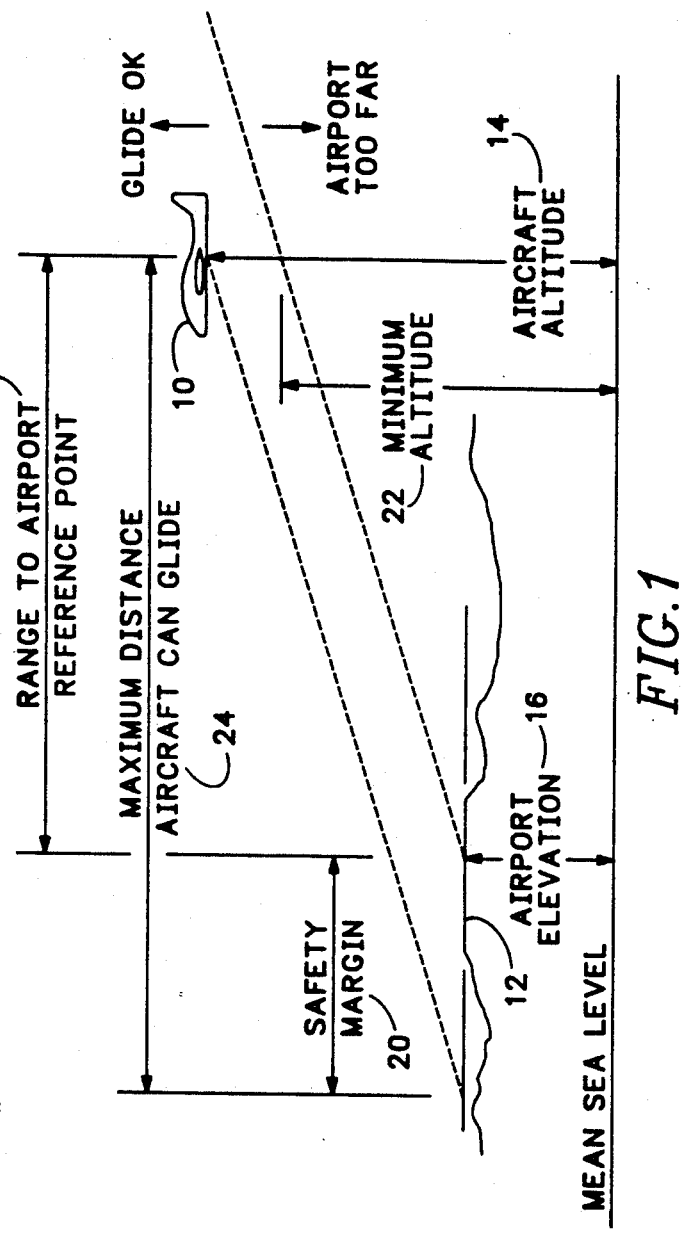
FIG. 1 is an illustration of an application of a glide safety determination system according to the present invention.

The application of the preferred embodiment of the glide safety determination system of the present invention is illustrated in FIG. 1. When an aircraft 10 loses power, its pilot must determine whether the aircraft can safely glide to a selected landing site, such as airport 12. If not, the pilot must consider alternative landing sites, and select one to which the aircraft can safely glide.

In order to determine whether the aircraft 10 can safely glide to a selected landing site, a number of factors should be taken into account: the aircraft altitude 14; the airport (or other landing site) elevation 16; the range to the airport 18; whether a turn is required to reach the airport; the flight performance parameters of the aircraft; and the desired safety margin. From this information it can be determined what minimum altitude 22 is required to glide to a selected destination, what maximum distance 24 the aircraft can glide from its current altitude in the direction of the selected destination, whether the aircraft can reach the selected destination, and the safety margin 20 in gliding to the selected destination. If the aircraft 10 is above the minimum altitude 22, as shown in FIG. 1, then the aircraft can glide to the selected airport. But, if the aircraft is below the minimum altitude, it cannot reach that airport because the airport is too far away for a safe glide. The safety margin 20 is the difference between the maximum distance that the aircraft can glide in the direction of the selected airport from its current altitude and the distance to the selected airport.

Figure 2:
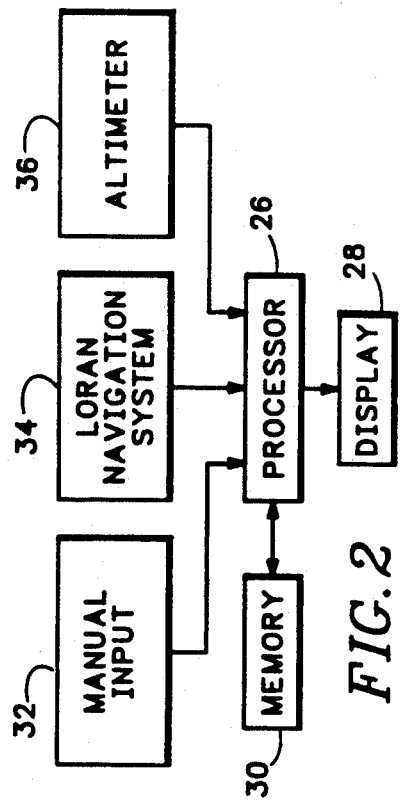
FIG. 2 is a block diagram of a preferred embodiment of a glide safety determination system according to the present invention.
Figure 3B:
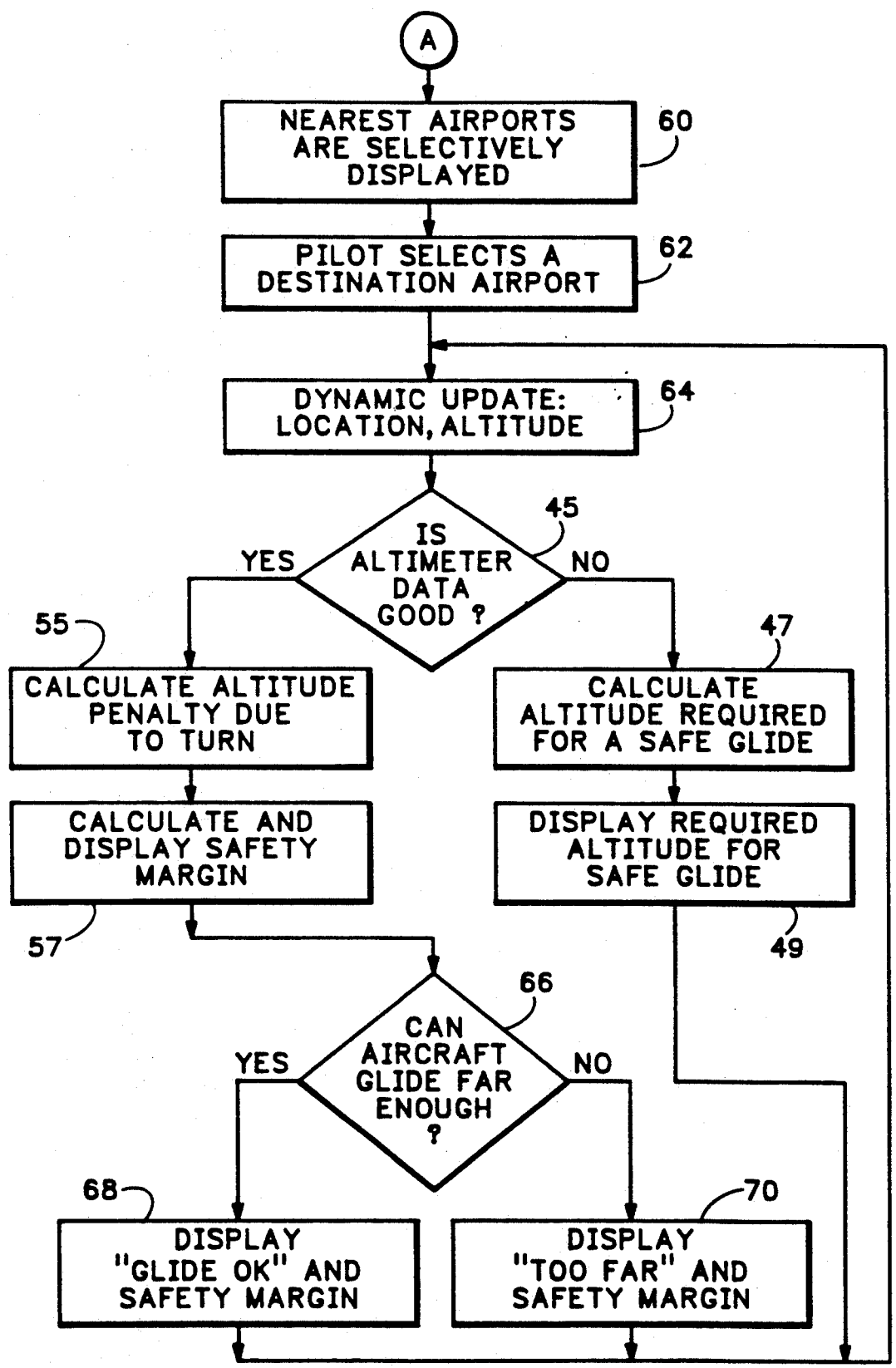
FIGS. 3A and 3B are a flow chart of a processor program for use in a preferred embodiment of a glide safety determination system according to the present invention.
Figure 3A:
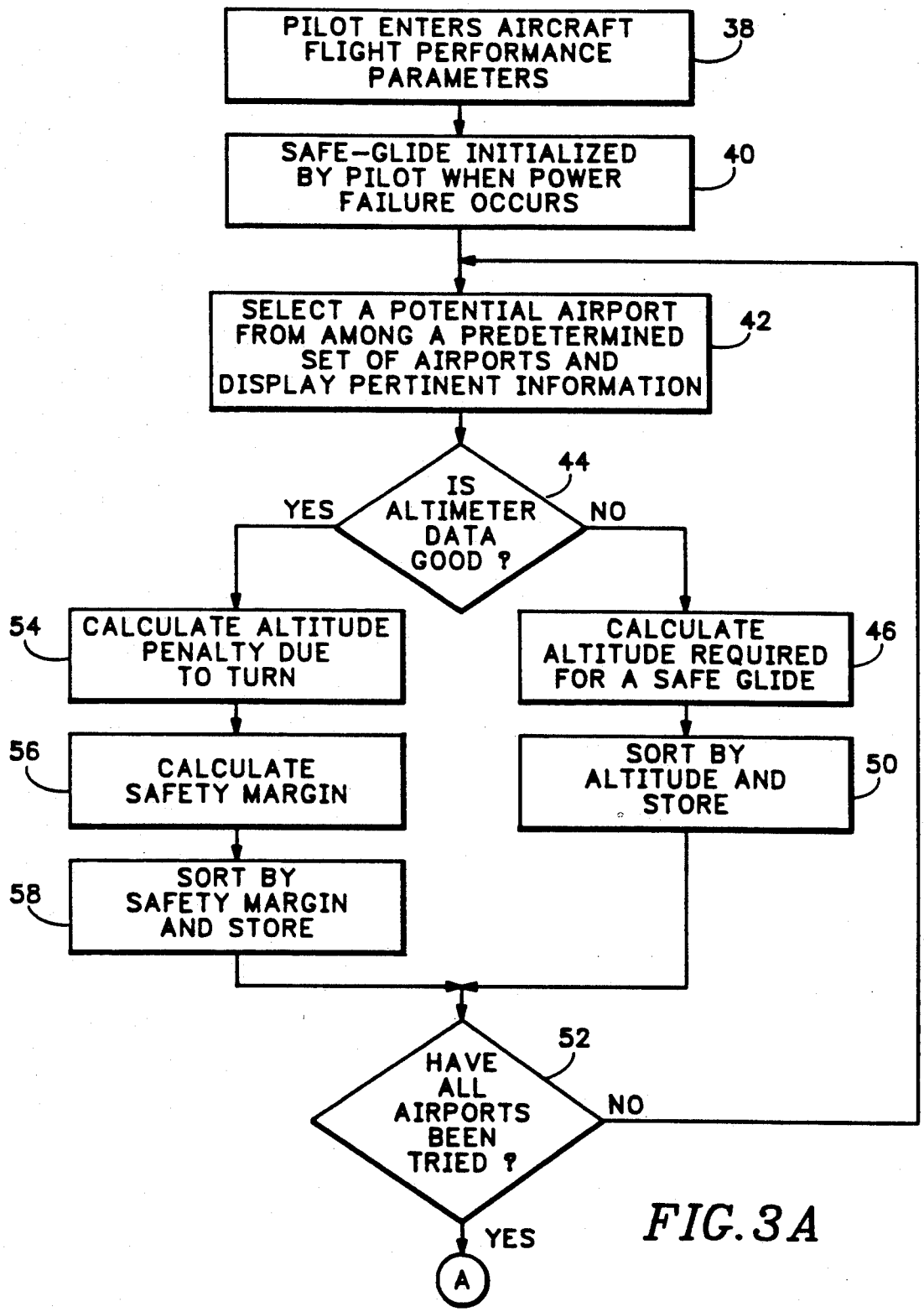

The glide safety determination system of the present invention is preferably physically implemented as shown in FIGS. 2, 3A, and 3B. The necessary computations are carried out by a digital computer processor 26, such as any of many commonly known microprocessor systems, and the results are shown on an appropriate visual display 28, such as a light emitting diode display or any of a number of other commonly known types of displays. An appropriate processor computer program, and data used by the processor, are stored in a memory 30, which may also be of any of a variety of commonly known types of memory for microprocessor computer systems. The memory may be comprised of, or partitioned into, various parts which act as respective sources of, or storage locations for, data.

Data input for the processor 26 is provided by three devices. First, the aircraft flight performance parameters are provided by a manual input 32, such as a keyboard or special purpose buttons, and stored in a location of memory 30 that thereafter acts as a source of that data. A Loran navigation system 34 provides the current location of the aircraft 10. An electronic altimeter 36 provides the current altitude of the aircraft. The locations and elevations of a predetermined set of airports that are possible landing sites are stored in the memory 30, preferably in read-only memory devices, which thereafter act as a source for that data. The processor receives this information and displays for the pilot: (1) The identity of a predetermined number, preferably 25, of the nearest airports; (2) the locations of, elevations of, and bearings to those airports, and the lengths of their runways; and (3) the altitude required to reach each such airport from the current location of the aircraft, or the safety margin for a glide to each such airport from the current position of the aircraft. Based on this information, the pilot then selects an appropriate airport.

Turning now to FIGS. 3A and 3B, the processor program preferably works in accordance with the flow chart shown therein. In step 38, the pilot initially enters the aircraft flight performance parameters manually, through the manual input device 32. Preferably, this need only be done once, that is, until those parameters have changed. In step 40, the glide safety determination system is initialized and started by the pilot when there is a power failure. When this is done, the system sorts through a predetermined set of possible airport landing sites to find the 25 closest airports.

In step 42, the system selects one of the possible airport landing sites and displays (1) its location, (2) its elevation, (3) the bearing from the aircraft to the selected airport, and (4) the length of its runway.

In step 44, the altimeter data is tested to determine whether or not it is good. The altitude data may be considered not good if (1) there is no signal from the altimeter 36, (2) a check sum test, as is commonly known in the art, indicates that the data is not valid, or (3) the altimeter provides a signal indicating that its data is unreliable. Other or different tests may also be devised without departing from the principles of this invention. If the altimeter data is not good, it is ignored.

If the altitude data is not reliable, the processor calculates, in step 46, the altitude required to glide safely to the selected destination. In step 50, the airport identifier and required altitude are then stored in a predetermined location of the memory 30 which is set aside for storing the 25 nearest airports. If one or more airports have already been stored in that location, they are sorted by required altitude to put them in descending order, up to 25 airports.

After step 50, the system determines in step 52 whether all possible airport landing sites have been tried. If not, the processor returns to step 42, selects a new airport, and repeats the subsequent steps.

On the other hand, if the altimeter data is reliable, the processor calculates, in step 54, the penalty due to making any required turns. Then it calculates the safety margin, in step 56. In step 58, the airport identity and safety margin are then stored in the predetermined location of the memory 30 which is set aside for storing the 25 nearest airports. If one or more airports have already been stored in that location, they are sorted by safety margin to put them in descending order, up to 25 airports.

Step 52 is then performed as explained above. If all possible airports have been tried, the system then goes on to the steps shown in FIG. 3B.

Once step 52 has been performed with an affirmative result, a predetermined number of the nearest airports, e.g., the 25 nearest airports, and their pertinent information, including minimum altitude or safety margin, are selectively displayed at the request of the pilot, as indicated by status block 60. The pilot then selects a specific destination airport, as indicated by step 62. Thereafter, the system repetitively performs a series of steps to continually update the pilot on the safety of a glide to the selected airport.

In step 64, the current location and the current altitude of the aircraft are determined. As in step 44, the altimeter data is checked in step 45 to determine whether or not it is reliable. If the altimeter data is not reliable, the processor calculates, in step 47, the altitude required to glide safely to the selected destination and displays that altitude in step 49. Then, the system simply returns to step 64. On the other hand, if the altimeter data is reliable, the processor calculates, in step 55, the penalty due to making any required turns. Then it calculates and displays the safety margin, in step 57. After that, step 66 is performed.

If the aircraft can safely glide to the selected airport, as determined in step 66, the processor displays "GLIDE OK" and the amount of the safety margin, in step 68. It then returns to step 64 and repeats the subsequent steps. If the processor determines in step 66 that the aircraft cannot glide far enough, it displays "TOO FAR" and the safety margin in step 70, then returns to step 64 and repeats the subsequent steps. The pilot may select different airports, or other landing sites, for the glide safety determination system to try, and the foregoing process will be repeated to provide the needed information for each such airport or other destination.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An on-board aircraft system for providing an indication as to whether said aircraft can safely glide to a selected destination, comprising:
   (a) a radio navigation instrument on board said aircraft which provides data in the form of an electrical signal representing the current location of said aircraft;
   (b) first source means on board said aircraft for providing in the form of an electrical signal data representing the current altitude of said aircraft;
   (c) second source means on board said aircraft for providing data in the form of an electrical signal representing the position of a selected target destination;
   (d) third source means on board said aircraft for providing data in the form of an electrical signal representing the flight performance characteristics of said aircraft; and
   (e) electronic data processor means, on board said aircraft and responsive to said data from said radio navigation instrument, said first source means, said second source means and said third source means, for producing, based on said current location of said aircraft, said altitude of said aircraft, said position of said selected target destination, and said flight performance data, an indication of whether said aircraft can glide to said selected target destination.

2. The system of claim 1 further comprising means responsive to said first source means for determining whether or not said electrical signal representing current altitude is reliable.

3. The system of claim 1 wherein said second source means comprises an electronic data storage device.

4. The system of claim 1 wherein said third source means comprises an electronical data storage device.

5. The system of claim 1, further comprising display means for providing a visual indication of whether said aircraft can safely glide to said target destination.

6. The system of claim 1, further comprising display means for providing a visual indication of the difference between the distance to said target destination and the distance that said aircraft can glide at its current altitude.

7. The system of claim 1, further comprising display means for providing a visual indication of the minimum altitude required for said aircraft to glide to said target destination from its current location.

8. The system of claim 1, further comprising display means for providing a visual indication of a predetermined number of nearest landing sites from among a set of possible landing sites.

9. The system of claim 1 wherein said processor means comprises programmed electronic digital data processor.

10. The system of claim 1 wherein said data processor means is adapted to determine the difference between the distance to said target destination and the distance that said aircraft can glide at its current altitude.

11. The system of claim 1, wherein said data processor means is adapted to determine the minimum altitude required for said aircraft to glide to said target destination from its current location.

12. The system of claim 1, wherein said data processor means is adapted to select as target destinations a predetermined number of nearest landing sites from among a set of possible landing sites.

13. The system of claim 1, wherein said radio navigation instrument comprises a Loran device.

14. The system of claim 1, wherein said first source means comprises an altimeter.

15. A method for determining on board an aircraft whether said aircraft can safely glide to a selected target destination, comprising:
   (a) providing from a radio navigation instrument on board said aircraft to an electronic data processor on board said aircraft an electrical data signal representing the current location of said aircraft;
   (b) providing from a first source on board said aircraft to said electronic data processor an electrical data signal representing the current altitude of said aircraft;
   (c) providing from a second source on board said aircraft to said electronic data processor an electrical data signal representing the current position of said selected target destination;
   (d) providing from a third source on board said aircraft to said electronic data processor an electrical data signal representing the flight performance characteristics of said aircraft; and
   (e) causing said electronic data processor to produce, based on said current location, said current altitude, said selected target destination, and said flight performance data, an indication of whether said aircraft can glide to said selected target destination.

16. The method of claim 15, further comprising determining whether said altitude data is valid and, if not, displaying the altitude required to glide to said target location.

17. The method of claim 15, further comprising providing a visual display as to whether said aircraft can safely glide to said target destination.

18. The method of claim 15, further comprising providing a visual display of the difference between the distance to said target destination and the distance that said aircraft can glide at its current altitude.

19. The method of claim 15, wherein said radio navigation instrument comprises a Loran device.

20. The method of claim 15, wherein said first source comprises an altimeter.

21. The method of claim 15, wherein said second source comprises an electronic data storage device.

22. The method of claim 15, wherein said third source comprises an electronic data storage device.

23. The method of claim 15, further comprising causing said electronic data processor to select as target destinations a predetermined number of nearest landing sites from among a set of possible landing sites.

24. An on-board aircraft system for providing an indication as to whether said aircraft can safely glide to a selected destination, comprising:
   (a) first source means on board said aircraft for providing data in the form of an electrical signal representing the current location of said aircraft;
   (b) an altimeter on board said aircraft for providing in the form of an electrical signal data representing the current altitude of said aircraft;
   (c) second source means on board said aircraft for providing data in the form of an electrical signal representing the position of a selected target destination;
   (d) third source means on board said aircraft for providing data in the form of an electrical signal representing the flight performance characteristics of said aircraft; and (e) electronic data processor means, on board said aircraft and responsive to said data from said first source means, said altimeter, said second source means, and said third source means, for producing, based on said current location of said aircraft, said altitude of said aircraft, said position of said selected target destination, and said flight performance data, an indication of whether said aircraft can glide to said selected target destination.

25. An on-board aircraft system for providing an indication as to whether said aircraft can safely guide to a selected destination, comprising:
   (a) first source means on board said aircraft for providing data in the form of an electrical signal representing the current location of said aircraft;
   (b) second source means on board said aircraft for providing in the form of an electrical signal data representing the current altitude of said aircraft;
   (c) an electronic data memory on board said aircraft for providing data in the form of an electrical signal representing the position of a selected target destination;
   (d) third source means on board said aircraft for providing data in the form of an electrical signal representing the flight performance characteristics of said aircraft; and
   (e) electronic data processor means, on board said aircraft and responsive to said first source means, said second source means, said electronic data memory, and said third source means, for producing, based on said current location of said aircraft, said altitude of said aircraft, said position of said selected target destination, and said flight performance data, an indication of whether said aircraft can glide to said selected target destination.

26. An on-board aircraft system for providing an indication as to whether said aircraft can safely glide to a selected destination, comprising:
   (a) first source means on board said aircraft for providing data in the form of an electrical signal representing the current location of said aircraft;
   (b) second source means on board said aircraft for providing in the form of an electrical signal data representing the current altitude of said aircraft;
   (c) third source means on board said aircraft for providing data in the form of an electrical signal representing the position of a selected target destination;
   (d) an electronic data memory on board said aircraft for providing data in the form of an electrical signal representing the flight performance characteristics of said aircraft; and
   (e) electronic data processor means, on board said aircraft and responsive to said data from said first source means, said second source means, said third source means, and said electronic data memory for producing, based on said current location of said aircraft, said altitude of said aircraft, said position of said selected target destination, and said flight performance data, an indication of whether said aircraft can glide to said selected target destination.

27. A method for determining on board an aircraft whether said aircraft can safely glide to a selected target destination, comprising:
   (a) providing from a first source on board said aircraft to an electronic data processor on board said aircraft an electrical data signal representing the current location of said aircraft;
   (b) providing from an altimeter on board said aircraft to said electronic data processor an electrical data signal representing the current altitude of said aircraft;
   (c) providing from a second source on board said aircraft to said electronic data processor an electrical data signal representing the current position of said target destination;
   (d) providing from a third source on board said aircraft to said electronic data processor an electrical data signal representing the flight performance characteristics of said aircraft; and
   (e) causing said electronic data processor to produce, based on said current location, said current altitude, said target destination, and said flight performance data, an indication of whether said aircraft can glide to said selected target destination.

28. A method for determining on board an aircraft whether said aircraft can safely glide to a selected target destination, comprising:
   (a) providing from a first source on board said aircraft to an electronic data processor on board said aircraft an electrical data signal representing the current location of said aircraft;
   (b) providing from a second source on board said aircraft to said electronic data processor an electrical data signal representing the current altitude of said aircraft;
   (c) providing from an electronic data memory on board said aircraft to said electronic data processor an electrical data signal representing the current position of said target destination;
   (d) providing from a third source on board said aircraft to said electronic data processor an electrical data signal representing the flight performance characteristics of said aircraft; and
   (e) causing said electronic data processor to produce, based on said current location, said current altitude, said target destination, and said flight performance data, an indication of whether said aircraft can glide to said selected target destination.

29. A method for determining on board an aircraft whether said aircraft can safely glide to a selected target destination, comprising:
   (a) providing from a first source on board said aircraft to an electronic data processor on board said aircraft an electrical data signal representing the current location of said aircraft;
   (b) providing from a second source on board said aircraft to said electronic data processor an electrical data signal representing the current altitude of said aircraft;
   (c) providing from a third source on board said aircraft to said electronic data processor an electrical data signal representing the current position of said target destination;
   (d) providing from an electronic data memory on board said aircraft to said electronic data processor an electrical data signal representing the flight performance characteristics of said aircraft; and
   (e) causing said electronic data processor to produce, based on said current location, said current altitude, said target destination, and said flight performance data, an indication of whether said aircraft can glide to said selected target destination.

* * * * *